United States Patent [19]

Tanaka et al.

[11] 4,454,437
[45] Jun. 12, 1984

[54] STATOR FRAME AND HOUSING FOR VENTICULAR STARTING MOTOR WITH REDUCTION GEARS

[75] Inventors: Toshinori Tanaka; Akira Morishita, both of Himeji, Japan

[73] Assignee: Mitsubishi Denki Kabushiki Kaisha, Japan

[21] Appl. No.: 433,707

[22] Filed: Oct. 12, 1982

[30] Foreign Application Priority Data

Oct. 30, 1981 [JP] Japan .................................. 56-163440

[51] Int. Cl.³ ............................................. H02K 7/10
[52] U.S. Cl. ....................................... 310/83; 310/154
[58] Field of Search ........ 310/83; 123/179 A, 179 M; 310/154, 83

[56] References Cited

U.S. PATENT DOCUMENTS

| | | | |
|---|---|---|---|
| 2,464,847 | 3/1949 | Coffey | 310/83 |
| 3,209,603 | 10/1965 | Rodriguez | 74/7 A |
| 3,307,056 | 2/1967 | Wooley | 310/83 |
| 3,676,725 | 7/1972 | Wiser et al. | 310/83 |
| 4,156,817 | 6/1979 | Preece et al. | 290/38 R |
| 4,163,165 | 7/1979 | Purdy | 310/154 |
| 4,399,380 | 8/1983 | Hirano | 310/83 |

FOREIGN PATENT DOCUMENTS 1096738 12/1967 United Kingdom ................. 310/83

Primary Examiner—William M. Shoop
Assistant Examiner—D. L. Rebsch
Attorney, Agent, or Firm—Leydig, Voit, Osann, Mayer & Holtd, Ltd.

[57] ABSTRACT

A permanent magnet starting motor equipped with reduction gears has a stator frame of a D.C. motor, which constitutes the starting motor, made of a tubular member which has a bottom portion. A rotary shaft of an armature is inserted from within the D.C. motor into a penetrating hole provided in the bottom portion of the tubular member, in a manner to protrude beyond the penetrating hole. A sliding-contact engagement portion holds the bottom portion of the stator frame and the rotary shaft of the armature in engagement in an axial direction, and that the reduction gears which are driven by the rotary shaft of the armature are installed in the bottom portion.

1 Claim, 2 Drawing Figures

STATOR FRAME AND HOUSING FOR VENTICULAR STARTING MOTOR WITH REDUCTION GEARS

BACKGROUND OF THE INVENTION

This invention relates to an improved structure of an internally-decelerated starting motor which is equipped with planetary reduction gears.

A prior-art device of the specified type has been as shown in FIG. 1. A D.C. motor 2 which is a prime mover for the starting motor 1, and which D.C. motor 2 has an end part where an intermediate bracket 3 of reduction gears is fastened in engagement with a yoke 5 of a field assembly 4. A pole 6 is secured to the yoke 5, and for which a permanent magnet member of ferrite is used. An armature 7 has a rotary shaft 8. The front end part of the rotary shaft 8 is journaled in a sleeve bearing 9 which is secured to the inner peripheral surface of the intermediate bracket 3, while the rear end part thereof is journaled in a sleeve bearing 11 which is snugly fitted on the inner peripheral surface of a rear bracket 10 that is fastened in engagement with the rear end part of the yoke 5 of the fields assembly 4. A spur gear 12 is formed at the front end part of the rotary shaft 8, and which drives reduction gear similar to ones to be described later, in engagement therewith. A stopper 13 is installed in a recess 14 formed in the rear end part of the rotary shaft 8, and a retaining ring 15 which is similarly installed. A brush assembly 17 effects the commutation of the armature 7 in sliding contact with a commutator 16, and numeral 18 a thrust washer.

Now the operation of the above construction will be described. The armature 7 is energized through the brush assembly 17 as well as the commutator 16, and receives the energizing force of the permanent magnet from the field assembly 4, to generate a turning force. This turning force is transmitted to the rotary shaft 8, so that the reduction gears similar to ones to be described later (FIG. 2) are driven through the spur gear 12. An output from the reduction gears is transmitted to an internal combustion engine, not shown, and the internal combustion engine is started.

The prior-art device is as stated above. The D.C. motor is not unitarily constructed, but the front end part of the rotary shaft 8 has an open structure, so that the operations of assembling the D.C. motor with the reduction gears are sometimes difficult. In particular, the armature 7 is attracted to the pole 6 constructed of the permanent magnet, in biased fashion, and the eccentricity of the rotary shaft 8 is great, so that the rotatable mounting of the rotary shaft in the sleeve bearing 9 is sometimes difficult. A further disadvantage is that a magnetic member is attracted to the pole 6 through the open end of the D.C. motor. Another disadvantage is that the intermediate bracket 3 is a separate member and increases the number of components. After all, the prior-art device is demeritorious as an electric part for automobiles to be mass-produced.

SUMMARY OF THE INVENTION

This invention has been made in order to eliminate the disadvantages of the prior-art device as described above, and has for its object to provide an internally-decelerated starting motor equipped with a D.C. motor which is made very easy to machine for mass production and is made simple in structure in such a way that a yoke is press-worked by the use of a deep-drawn steel plate and that a bottom portion having an intermediate bracket mechanism is integrally constructed.

DESCRIPTION OF THE PREFERRED EMBODIMENT

Figure 1:
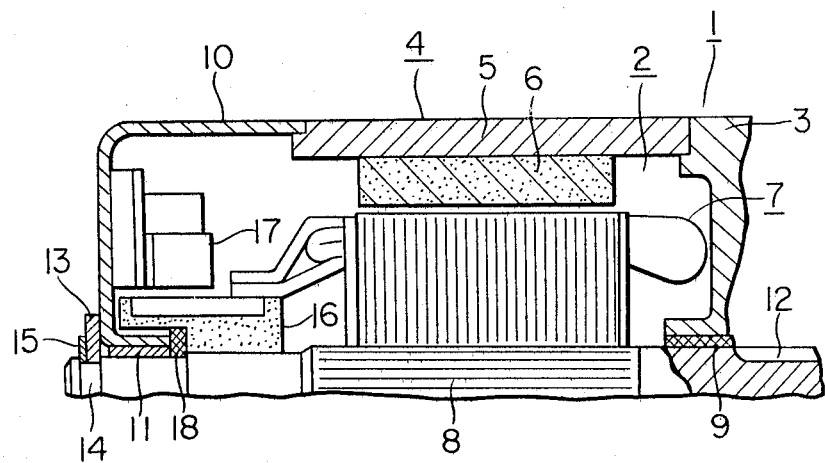
FIG. 1 is a half sectional view of essential portions for explaining a prior-art device.
Figure 2:
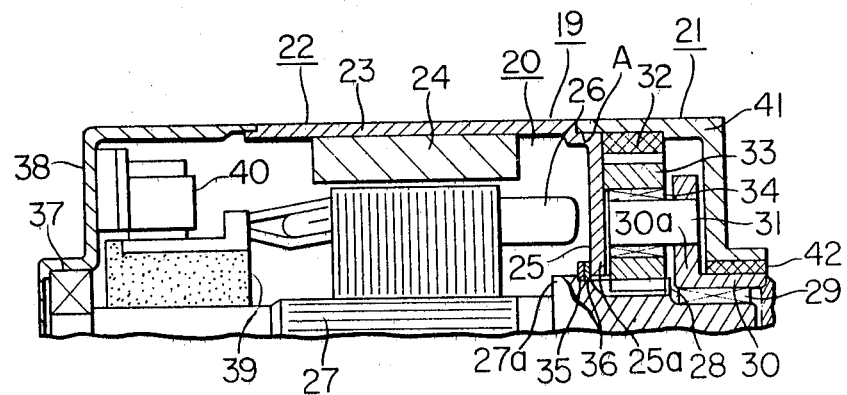
FIG. 2 is a half sectional view of essential portions in a planet gear type internally-decelerated permanent-magnet starting motor embodying this invention.

An embodiment of this invention will now be described with reference to the drawings. Referring to FIG. 2, an internally-decelerated starting motor 19 is principally constructed of a D.C. motor 20, planetary reduction gears 21, and a device (not shown) for engagement with an internal combustion engine, not shown, the device being driven by the planetary reduction gears 21. A field assembly (22) includes a tubular yoke 23 that is fabricated by the press work of a deep-drawn soft steel plate member, and a pole 24 that is made of a permanent magnet member of ferrite, and that is secured to the inner peripheral surface of the yoke 23. Further, a bottom portion 25 is arranged in the front end part of the field assembly 22 and also serves the function of an intermediate bracket. An armature 26 has a rotary shaft 27. The front end part of the rotary shaft 27 is inserted through a penetrating hole 25a provided in the bottom portion 25. That part of the shaft end which projects beyond the penetrating hole 25a is formed with a spur gear 28. Further, that part of the shaft end which is extended is journaled in a sleeve bearing 29. Numeral 30 indicates a rotary output member in which the sleeve bearing 29 is snugly fitted, which has a pin 31 secured to a flange portion 30a thereof, and which supports a planet gear 33 through a bearing 34, the planet gear being normally held in mesh with the spur gear 28, as well as a ring gear (internal gear) 32. The gearing described above constitutes the planetary reduction gears. Numerals 35 and 36 indicate thrust washers, which are fastened in a manner to abut on a protrusion 27a of the rotary shaft 27, and which abut on the bottom portion 25 so as to receive the frontward (rightward as viewed in the figure) protrusive force of the armature 26. A ball bearing 37 bears the rear end part of the rotary shaft 27, which is mounted on the inner peripheral surface of the central part of a rear bracket 38 that is fastened in engagement with the opening of the rear end part of the yoke 22. A brush assembly 40 is held in sliding contact with a commutator 39 and which is mounted on the rear bracket 38. A gear housing 41 encompasses and supports the planetary reduction gears, which is fitted in a socket portion (A) provided in the front end part of the yoke 23, and which is fastened unitary with the yoke 23 in a manner to sandwich the ring gear 32 therebetween. A sleeve bearing 42 is snugly fitted on the inner peripheral surface of the gear housing 41, and which bears the rotary output member 30.

Now, the operation of the device of the present invention constructed as explained will be described. The armature 26 is energized through the brush assembly 40, as well as the commutator 39, and generates a turning force under the magnetic energization of the field assembly 22. This turning force is transmitted to the rotary shaft 27, and then transmitted to the planetary reduction gears 21 through the spur gear 28. Then the rotational speed of the rotary shaft is lowered, and the lowered speed is delivered at the rotary output member 30. A reaction force against the energization at this time develops in the yoke 23, as well as the ring gear 32, and is received by the gear housing 41. Further, it is transmitted to and received by a front bracket, not shown, which is installed on the gear housing 41.

According to the above construction, the D.C. motor 20 is first assembled as a subassembly, whereupon the reduction gears 21 are mounted. This brings forth the advantage that the assembling operations of the device are very easy. Another effect is that the subassembly has fewer chances of being stained by an external member.

While, in the above example, the effects have been explained as to the internally-decelerated starting motor, similar effects are achieved even when the present invention is applied to a D.C. motor with reduction gears in which a speed-down mechanism is installed in an end part and which is used for general equipment and appliances.

Further, the invention is also applicable to a case where the permanent magnet of a D.C. motor is disposed in an armature, and to a D.C. motor in which no permanent magnet is built.

A set forth above, according to this invention, the yoke of a D.C. motor in which a permanent magnet is built is fabricated by the deep-drawing press work of a soft steel plate, the rotary shaft of an armature is caused to penetrate through a tubular bottom portion formed at the press work, an engaging mechanism for a thrust load developing in the armature is disposed in the tubular bottom portion, and a socket portion is formed in the tubular bottom portion so as to mount planetary reduction gears thereon. The invention therefore has the effects that the assembling job efficiency of the motor is improved, that stains in the motor under the subassembly state, particularly the drawback of the attraction of a magnetic material member into the motor, are eliminated, and that an intermediate bracket which is interposed between the motor and the reduction gears installed on this motor is made integral to reduce the number of components of the device.

What is claimed is:

1. In a permanent magnet type starting motor equipped with reduction gears; the combination comprising: a stator frame for said starting motor including a unitary tubular member having a bottom portion, an armature located within said tubular member having a rotary shaft extending into a penetrating hole provided in said bottom portion of said tubular member, in a manner to protrude beyond said penetrating hole to a forward region, a rear bracket assembly fastened to said tubular member spaced from said bottom portion, said assembly including a bearing for said armature rotary shaft and a member contacting a sliding-contact engagement portion of said armature to hold said bottom portion of said stator frame and said rotary shaft of said armature in engagement in an axial direction, a housing fastened to said bottom portion in said forward region, and said reduction gears being connected to be driven by said rotary shaft of said armature and installed in said housing in said region forward of said bottom portion.

* * * * *